(12) United States Patent
Steiner (10) Patent No.: US 12,260,720 B2
(45) Date of Patent: Mar. 25, 2025

(54) VIDEO STREAM SELECTION SYSTEM

(71) Applicant: Toshiba Global Commerce Solutions, Inc., Durham, NC (US)

(72) Inventor: David J. Steiner, Durham, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 414 days.

(21) Appl. No.: 17/710,534

(22) Filed: Mar. 31, 2022

(65) Prior Publication Data

US 2023/0316884 A1 Oct. 5, 2023

(51) Int. Cl.
*G08B 13/196* (2006.01)
*H04N 7/18* (2006.01)

(52) U.S. Cl.
CPC . *G08B 13/19684* (2013.01); *G08B 13/19606* (2013.01); *G08B 13/19608* (2013.01); *G08B 13/19656* (2013.01); *H04N 7/181* (2013.01)

(58) Field of Classification Search
None
See application file for complete search history.

(56) References Cited

U.S. PATENT DOCUMENTS

| | | | |
|---|---|---|---|
| 7,587,454 | B2 | 9/2009 | Shabtai et al. |
| 2003/0107648 | A1 | 6/2003 | Stewart et al. |
| 2013/0188045 | A1 | 7/2013 | Kalevo |
| 2015/0262380 | A1* | 9/2015 | Grasmug ............... G06T 7/207 382/107 |
| 2017/0098126 | A1* | 4/2017 | Laska .................. G11B 27/028 |
| 2019/0213420 | A1* | 7/2019 | Karyodisa ............. G06V 20/41 |
| 2019/0354111 | A1* | 11/2019 | Cheng .................. G05D 1/0011 |

* cited by examiner

*Primary Examiner* — Gelek W Topgyal
(74) *Attorney, Agent, or Firm* — Kaufman & Canoles, P.C.

(57) ABSTRACT

Systems and methods of selecting a video stream resolution are provided. In one exemplary embodiment, a method comprises, by a network node operationally coupled over a network to a set of optical sensor devices positioned throughout a space that are operable to send at least one of a set of image streams to the network node. The method comprises receiving a first image stream of a set of image streams of the first optical sensor device that is selected based on both a confidence level that at least one object is correctly detected from a second image stream received from the first optical sensor and a current network bandwidth utilization to maintain the current network bandwidth utilization below a network bandwidth utilization threshold, with the first and second image streams having a different resolution and the first optical sensor having a viewing angle towards the detected object.

21 Claims, 8 Drawing Sheets

VIDEO STREAM SELECTION SYSTEM

BACKGROUND

An Internet Protocol (IP) camera is a type of digital video camera that receives control data and sends image data via an IP network. Some IP cameras can operate in a decentralized manner, as the camera is able to record directly to any local or remote storage media. IP cameras may be used for home security by sending a live video stream to a companion app on the user's phone. However, large businesses and commercial spaces require high-resolution video (i.e., 4K) from many IP cameras, with professional applications to accommodate the installation and management of the IP cameras.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Various embodiments of the present disclosure recognize that visual compute applications utilize substantial amounts of network bandwidth to deliver video data of Internet protocol (IP) cameras. For example, the number of full resolution video streams a computing device of a network receives is limited by the size of the video streams and the bandwidth of the network. Thus, network bandwidth limitations reduce the number of video streams a computing device may receive from an IP camera Conventional methods address this issue by adding network adapters and creating parallel network infrastructure. However, wireless IP cameras complicate these conventional methods. According to an embodiment of the present disclosure, there is a need for improved techniques controlling video stream selection of an IP camera and managing network bandwidth utilization.

In this disclosure, systems and methods of selecting a video stream and managing a network bandwidth utilization of a network are provided. IP cameras supply multiple video streams at different resolutions or frame rates to users for selection. The systems and method provided, utilize machine learning algorithms and neural networks with lower resolution video streams that are sufficient for computer vision tasks, such as, for example, object detection, object recognition, etc. to automatically select a higher or lower resolution video stream. Embodiments of the present disclosure analyze the result of the computer vision tasks and manage video stream selection according to defined thresholds (e.g., video resolution, frame rate, network bandwidth utilization, etc.).

Figure 1:
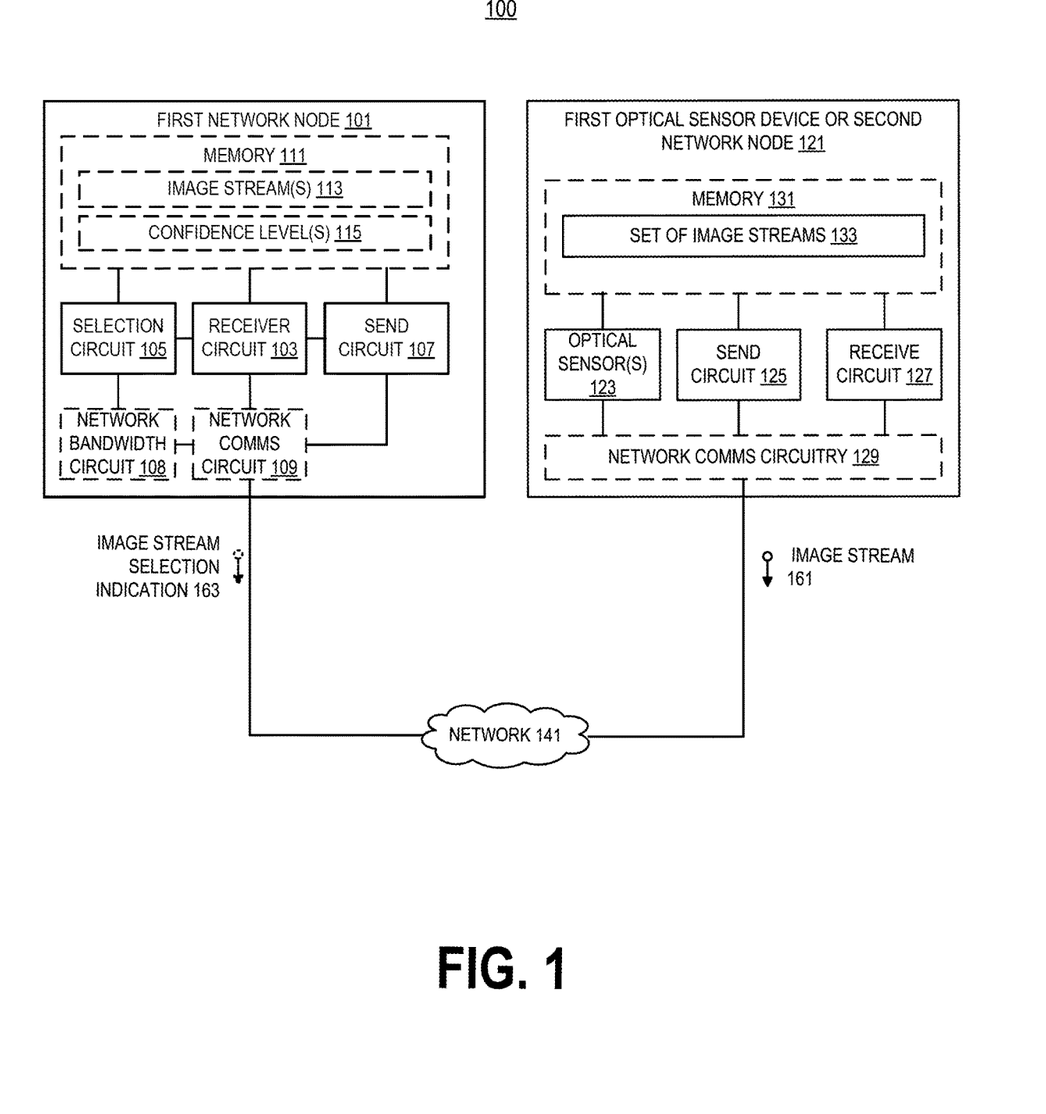
FIG. 1 illustrates one embodiment of a system that selects a video stream resolution in accordance with various aspects as described herein.

Accordingly, embodiments described herein include, among other things, improved techniques to enable network nodes to control video stream selection of IP cameras while enabling them to manage network bandwidth utilization. For example, utilizing a confidence level associated with detection or recognition of an object represented in an image stream to manage bandwidth utilization of a network by selecting image streams with lower or higher resolutions or frame rates. FIG. 1 illustrates one embodiment of a system 100 of selecting a video stream resolution in accordance with various aspect as described herein. In FIG. 1, the system 100 includes a first network node 101 operatively coupled to a first optical sensor device or second network node 121 (e.g., camera) over a network 131. The first network node 101 aid the second network node 121 can communicate over the network 141 (e.g., WFi, Ethernet, Internet). Further, the first network node 101 can be communicatively coupled to multiple instances of the second network node 121 over the network 141.

In FIG. 1 the first network node 101 includes a receiver circuit 103, a selection circuit 105, a send circuit 107, a network bandwidth utilization circuit 108, network communications circuitry 109, a memory 111, the like, or any combination thereof. The receiver circuit 103 is configured to receive information from network communications circuitry 109. The selection circuit 105 is configured to conditionally send, to the second network node 121, a selection of at least one of a set of image streams of an optical sensor device. The send circuit 107 is configured to send information to the network communications circuitry 109. The network bandwidth utilization circuit 108 is configured to determine the network bandwidth utilization over the network 141 or a certain connection or segment of the network 141. The network bandwidth utilization can provide an understanding of how bandwidth is utilized in a network or network connection or segment. In one example, network bandwidth utilization refers to the amount of bandwidth consumed on a network or network connection or segment. In another example, the network bandwidth utilization represents a percentage of network bandwidth utilized of the total network bandwidth available for a network or network connection or segment. In yet another example, network bandwidth utilization refers to the amount of data communicated over a network or network connection or segment during a predetermined time period. The predetermined time period can be a time period sufficient to determine the real-time, pseudo real-time, or non-real time network bandwidth utilization of a network or a certain connection or segment of a network. For instance, the predetermined time period can be in the range of one millisecond to one day. In one non-limiting embodiment, the predetermined time period is no more than ten milliseconds, in another embodiment no more than one hundred milliseconds, in another embodiment no more than one second, in another embodiment no more than ten seconds, in another embodiment no more than one minute, in another embodiment no more than one hour, and in another embodiment no more than one day. A skilled artisan will readily recognize techniques to determine network bandwidth utilization.

In addition, the network bandwidth utilization circuit 108 can determine the amount of data communicated between the first network node 101 and the second network node 121 over the network 141 during predetermined successive time periods, including for each image stream. In another non-limiting example, the network bandwidth utilization circuit 108 can request and in response, receive, from a device (e.g., network router) operationally coupled to the network 141, receive a network bandwidth utilization of the network 141 or a certain connection or segment of the network 141. In some implementations, the network bandwidth utilization circuit 108 can determine a current network bandwidth utilization of the first network node 101 and/or the second network node 121, including for each received image stream. The network communications circuitry 109 is configured to communicate information with the second network node 121 over the network 141 via any communication technology. The memory 111 is configured to include image stream(s) 113 and confidence levels) 115. Each image stream can include one or more sequential images. In some implementations, the image stream(s) 113 can include an object captured by the second network node 121. The confidence level(s) 115 can be values (e.g., percentages) associated with a level of certainty that the object is correctly detected or identified by the neural network.

In some implementations, the confidence level(s) 115 is associated with object detection, object identification, object classification, the like, or any combination thereof. A confidence level threshold represents a certain minimum level of certainty required to determine that an object is correctly detected, identified, or classified by the neural network. The confidence level threshold can be set in the range of fifty percent (50%) to one hundred percent (100%). In one non-limiting embodiment, the confidence level threshold is at least fifty percent (50%), in another embodiment is at least fifty five percent (55%), in another embodiment is at least sixty percent (60%), in another embodiment is at least sixty five percent (65%), in another embodiment is at least seventy percent (70%), in another embodiment is at least seventy five percent (75%), in another embodiment is at least eighty percent (80%), in another embodiment is at least eighty five percent (85%), in another embodiment is at least ninety percent (90%), and in another embodiment is at least ninety five percent (95%).

In the current embodiment, the second network node 121 includes optical sensor(s) 123, a receiver circuit 125, a send circuit 127, network communications circuitry 129, memory 131, the like, or any combination thereof. The optical sensor(s) 123 are configured to capture one or more images or sets of images of a certain region of a space. The receiver circuit 125 is configured to receive information from network communications circuitry 129. The send circuit 127 is configured to send information to the network communications circuitry 129, The network communications circuitry 129 is configured to send information over the network 141 such as to the first network node 101. The memory 128 is configured to include set of image streams 133. In some implementations, the set of image streams 133 are a stream of one or more images or sets of images captured by the optical sensor(s) 123. The set of image streams 133 may include a plurality of image streams with different resolutions or different frame rates.

In operation, the first network node 101 receives an image stream 161 that can include an image stream of the set of image streams 133 captured by the optical sensor(s) 123 from the second network node 121 over the network 141. In some implementations, an image of the image stream 161 includes an object positioned in a certain region of a space that is within a field of view of the optical sensor(s) 123. In those implementations, the processing circuitry may utilize one or more filtering algorithms to identify and enlarge a region of interest in the image of the optical sensor(s) 123 that includes the object. Additionally, the processing circuitry can detect spatial changes (e.g., position, movement) of the object of the region interest utilizing a sequence of images of the optical sensors) 123. The first network node 101 determines whether the confidence level(s) 115 corresponding to an object of the image stream is greater than or less than a confidence level threshold. In some implementations, the confidence level(s) 115 are obtained from the output of a neural network. The confidence level(s) 115 may be associated with a certain level of certainty of an object detection, object identification, object classification, the like, or combination thereof. If the confidence level(s) 115 corresponding to an object of the image stream is greater than a confidence level threshold, then the first network node 101 may select another image stream of the second network node 121 with a higher resolution or frame rate than the image stream of the image stream 161. However, if the confidence level(s) 115 corresponding to the object of the image stream is less than the confidence level threshold, then the first network node 101 may select another image stream of the second network node 121 with a lower resolution or frame rate than the image stream of the image stream 161. The first network node 101 may send an image stream selection indication 163 to the second network node 121 that can include a selection of another image stream.

In some implementations, the first network node 101 may also consider a network bandwidth utilization of the network 141 in addition to the confidence level(s) 115 corresponding to the object of the image stream(s) 129. The first network node 101 determines whether the selected image stream results in current network bandwidth utilization that is at least a network bandwidth utilization threshold. If streaming the selected image stream of the second network node 121 results in current network bandwidth utilization being at least a network bandwidth utilization threshold, then the first network node 101 selects another image stream of the second network node 121 having a lower resolution or frame rate than that selected image stream. In some implementations, the first network node 101 may select an additional image stream from another network node device (not shown) based on current network bandwidth utilization and the network bandwidth utilization threshold. In one example, the network bandwidth utilization threshold corresponds to a predetermined portion of the total bandwidth available for utilization on a network or network connection or segment. In another example, the network bandwidth utilization threshold is associated with the maximum number of image streams having a certain resolution or a certain frame rate that can be simultaneously transmitted over a network or network connection or segment. In yet another example; the network bandwidth utilization threshold corresponds to the current bandwidth available for utilization on a network or network connection or segment.

Figure 2A:
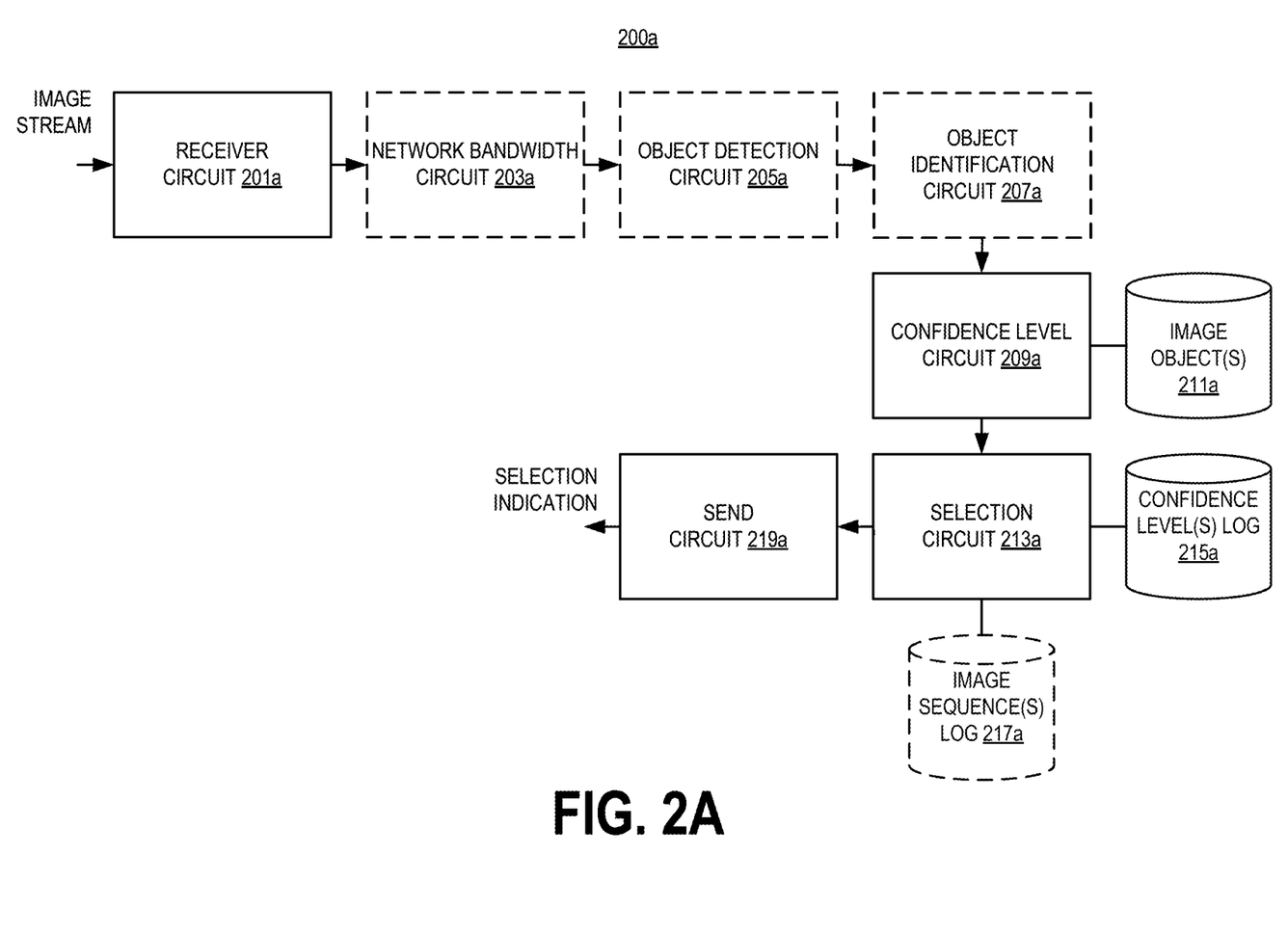
FIG. 2A illustrates one embodiment of a network node in accordance with various aspects as described herein.
Figure 2B:
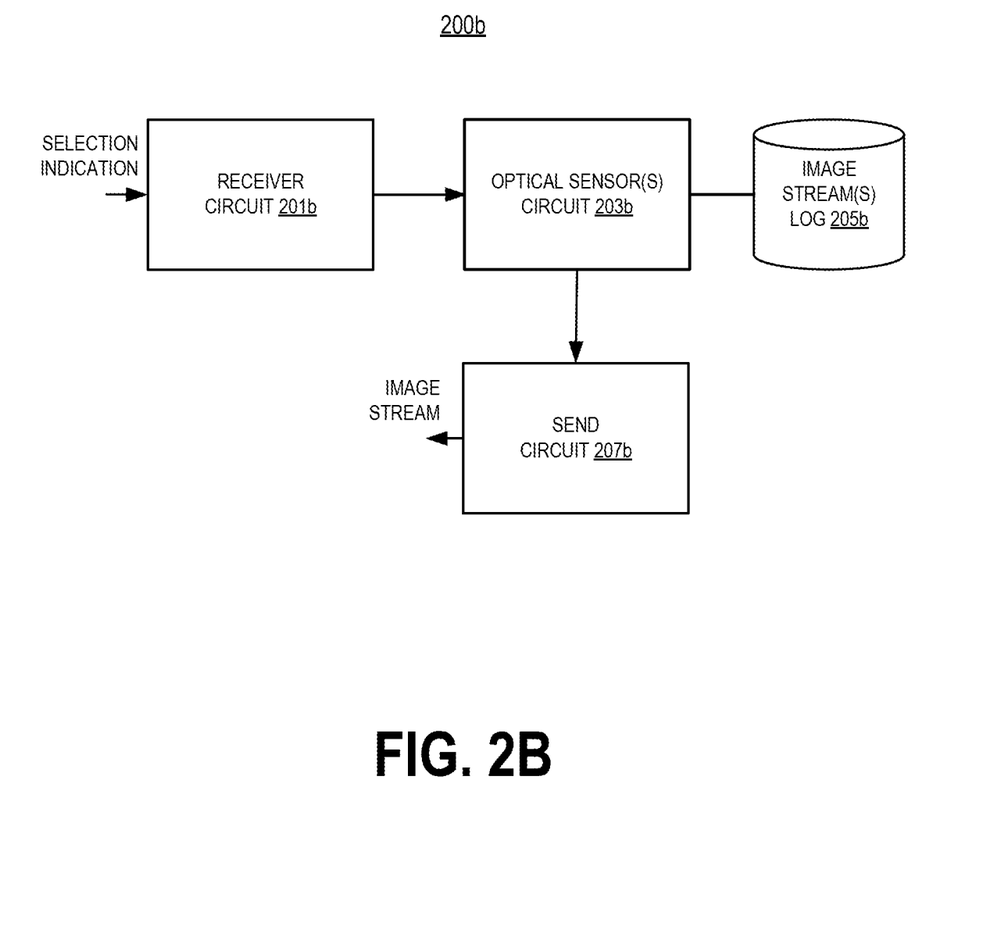
FIG. 2B illustrates one embodiment of an optical sensor device in accordance with various aspects as described herein.

FIGS. 2A-B illustrate embodiments of a first network node 200a and a second network node 200b, respectively, in accordance with various aspects as described herein. In FIG. 2A, the device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) herein) may include for instance: a receive circuit 201a operable to receive an image stream of the second network node 200b or a current network bandwidth utilization; a network bandwidth circuit operable to obtain a network bandwidth of a network; an object detection circuit 205a operable to detect an object within an image of the image stream; an object identification circuit 207a operable to identify an object withing an image of the image stream; a confidence level circuit 209a operable to obtain a confidence level of an image object of the image stream with a set of image object(s) 211a; the set of image objects 211a is a corpus of detected and/or identified objects of image streams; a selection circuit 213a operable to select an image stream of the set of image streams of the second network node 200b using a confidence level(s) log 215a and an image stream(s) log 217a; and a send circuit 219a operable to send an indication that selects an image stream of the second network node 200b.

In FIG. 2B, the device 200b implements various functional means, units, or modules (e.g., via the processing circuitry 301c in FIG. 3C, via the processing circuitry 501 in FIG. 5, via software code, or the like), or circuits. In one embodiment; these functional means, units, modules, or circuits (e.g., for implementing the method(s) herein) may include for instance: a receiver circuit 201b operable to receive an indication that selects an image stream of a set of image streams; an optical sensor(s) circuit 203b operable to capture one or more images; an image stream(s) log 205b operable to store one or more image streams captured by the optical sensor(s) circuit 205b; and a send circuit 207b operable to send an image stream of the set of image streams to the first network node 200a.

Figure 3A:
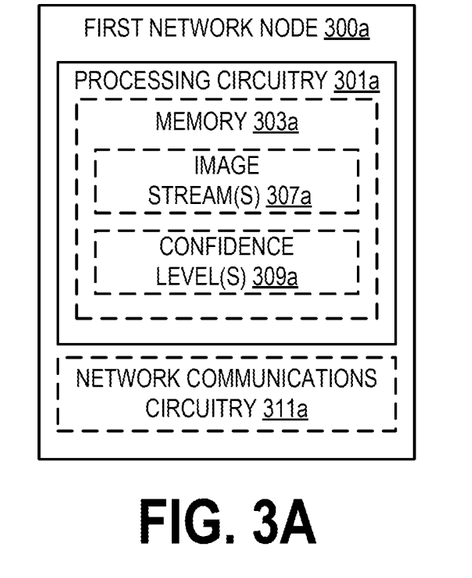
FIGS. 3A-B illustrate other embodiments of a network node in accordance with various aspects as described herein.
Figure 3B:
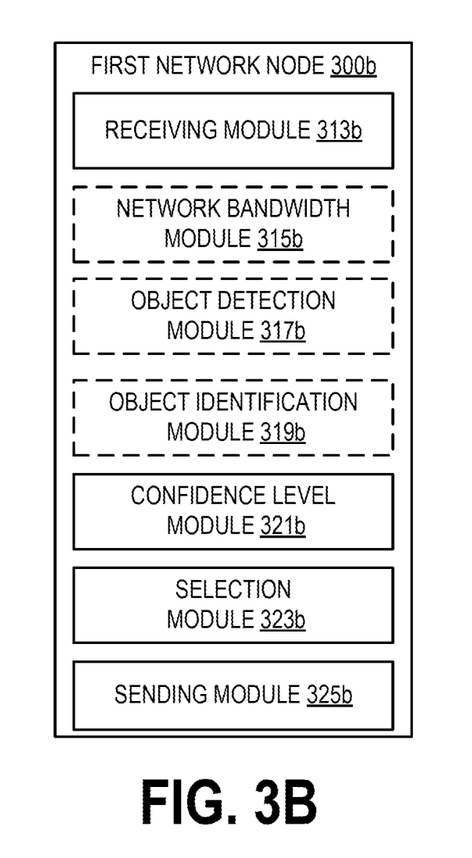

FIGS. 3A-B illustrate embodiments of a first network node 300a-b in accordance with various aspects as described herein. In FIG. 3A, the device 300a may include processing circuitry 301a that is operably coupled to one or more of the following: memory 303a and network communications circuitry 311a, The communication circuitry 311a is configured to transmit and/or receive intonation to and/or from one or more other nodes over a network via any communication technology. The processing circuitry 301a is configured to perform processing described herein, such as by executing instructions and accessing information stored in the memory 303a. The memory 303a may be configured to include image stream(s) 307a and confidence level(s) 309a. The processing circuitry 301a in this regard may implement certain functional means, units, or modules.

Figure 5:
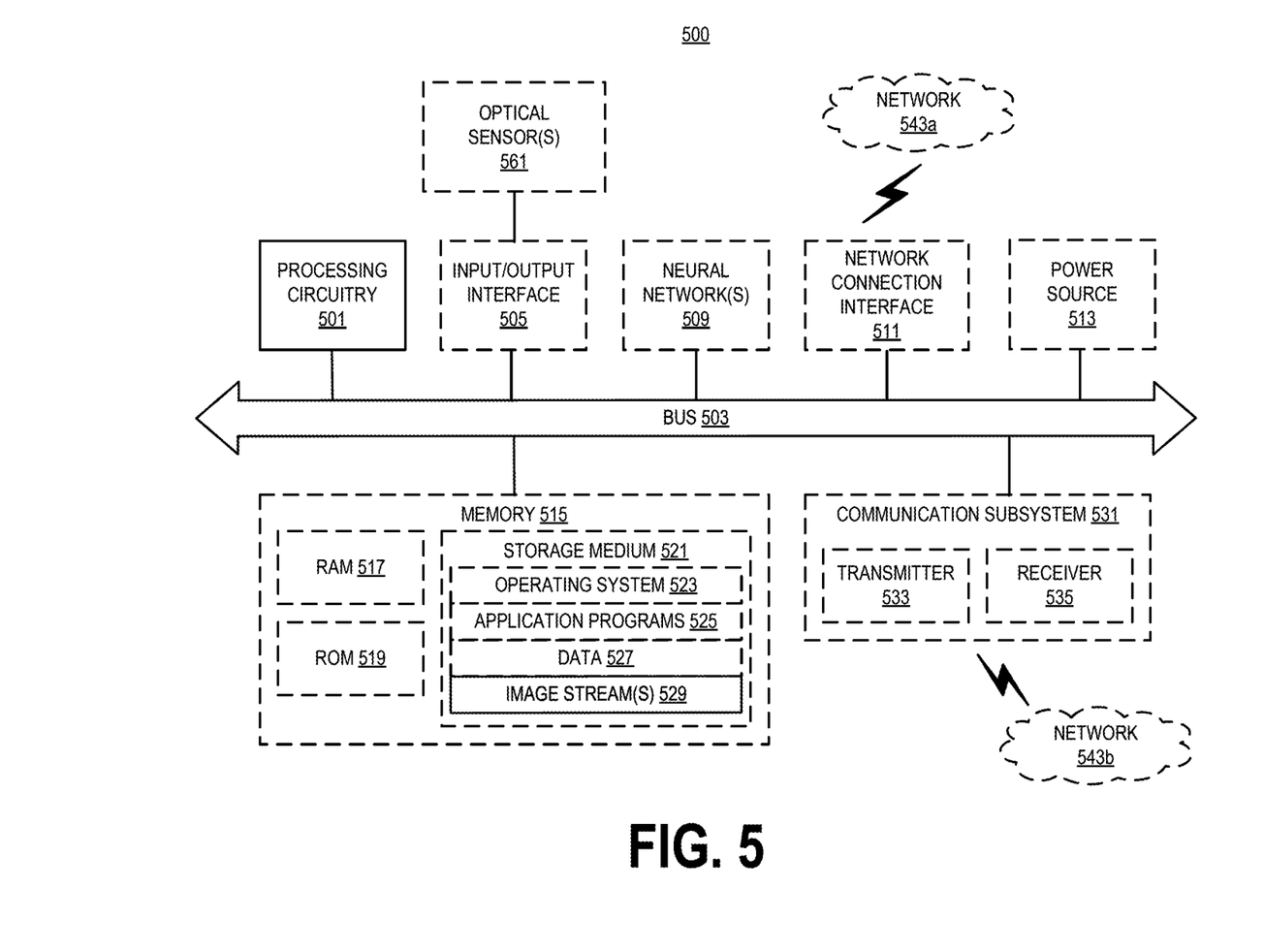
FIG. 5 illustrates another embodiment of a network node or an optical sensor device in accordance with various aspects as described herein.

In FIG. 3B, the device 300b implements various functional means, units, or modules (e.g., via the processing circuitry 301a in FIG. 3A, via the processing circuitry 501 in FIG. 5, via software code, or the like). In one embodiment, these functional means, units, or modules (e.g., for implementing the method(s) described herein) may include for instance: a receiving module 313b for receiving an image stream of a second network node; a network bandwidth module 315b for obtaining a network bandwidth of a network; an object detection module for detecting an object within an image of the image stream; an object identification module 319b for identifying an object withing an image of the image stream; a confidence level module 321b for obtaining a confidence level of an image object of the image stream; a selection module 323b for selecting another image stream of the set of image streams of the second network node; and a sending module 325b for sending an indication that selects an image stream of the second network node.

Figure 3C:
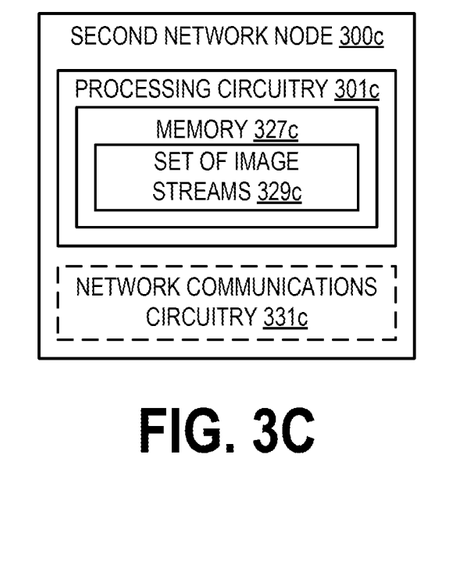
FIGS. 3C-D illustrate other embodiments of an optical sensor device in accordance with various aspects as described herein.
Figure 3D:
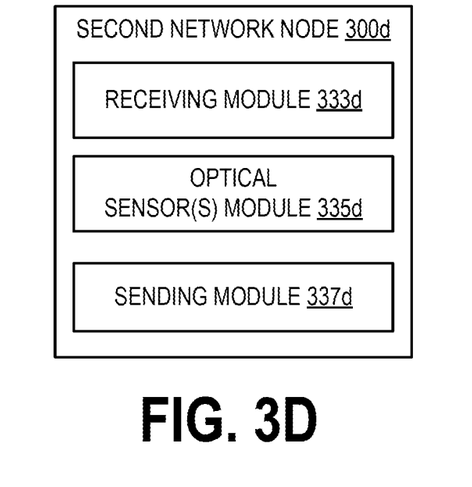

FIGS. 3C-D illustrate embodiments of a second network node 300c-d in accordance with various aspects as described herein. In FIG. 3C, the device 300c may include processing circuitry 301c that is operably coupled to one or more of the following: memory 327c and network communications circuitry 331c, The communication circuitry 331c is configured to transmit and/or receive intonation to and/or from one or more other nodes over a network via any communication technology. The processing circuitry 301c is configured to perform processing described herein, such as by executing instructions and accessing information stored in the memory 327c, The memory 327c is configured to include set of image streams 329c. The processing circuitry 301c in this regard may implement certain functional means, units, or modules.

In FIG. 3D, the device 300d implements various functional means, units, or modules (e.g., via the processing circuitry 301C in FIG. 3C, via the processing circuitry 501 in FIG. 5, via software code, or the like). In one embodiment, these functional means, units, or modules (e.g., for implementing the method(s) described herein) may include for instance: a receiving module 333d for receiving an indication that selects an image stream of a set of image streams; an optical sensor(s) module 335d for capturing capture one or more images; and a sending module 337d for sending an image stream of the set of image streams to the first network node.

Figure 4A:
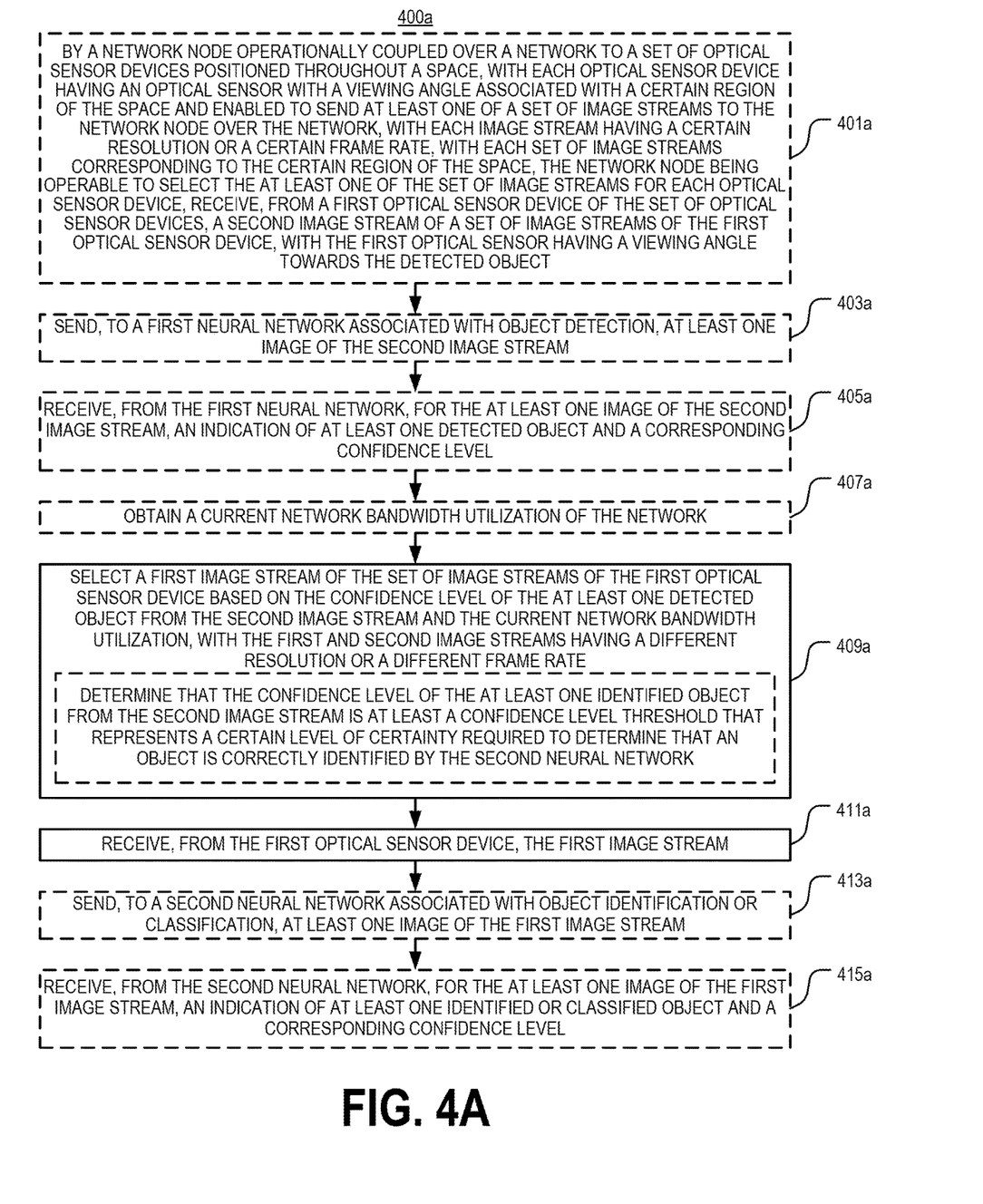
FIGS. 4A-C illustrate embodiments of a method performed by a network node of selecting a video stream in accordance with various aspects as described herein.
Figure 4B:
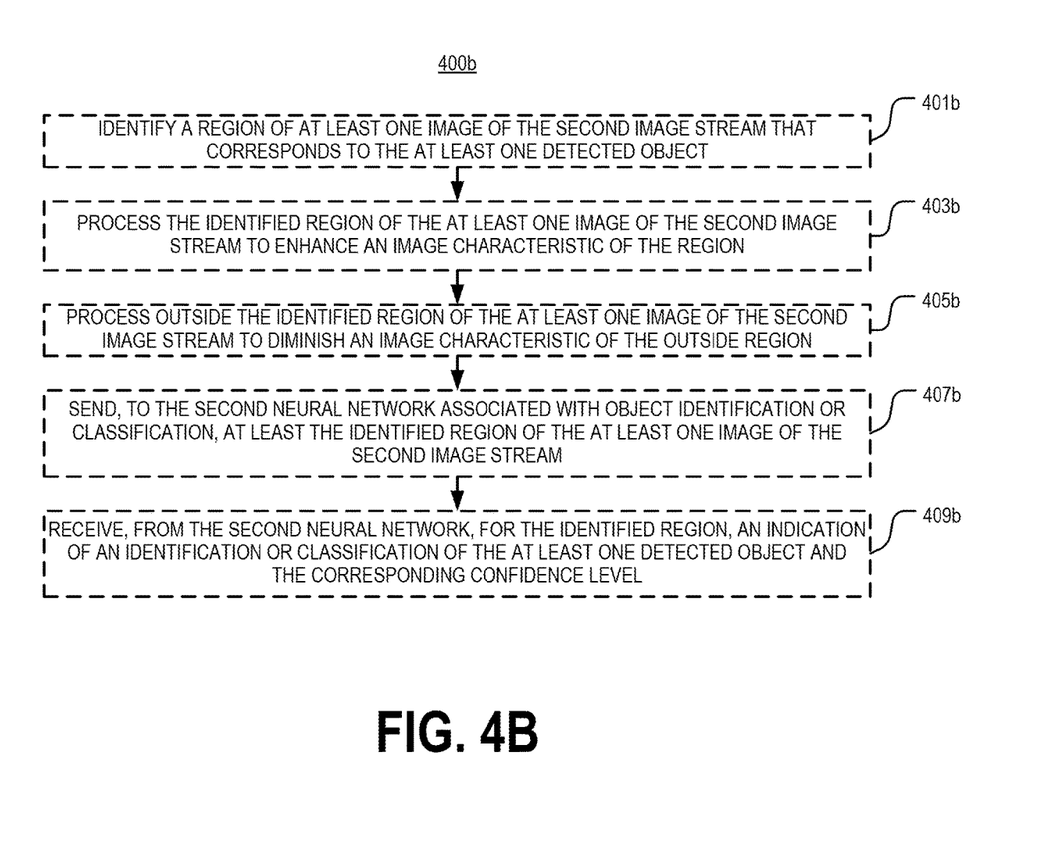
Figure 4C:
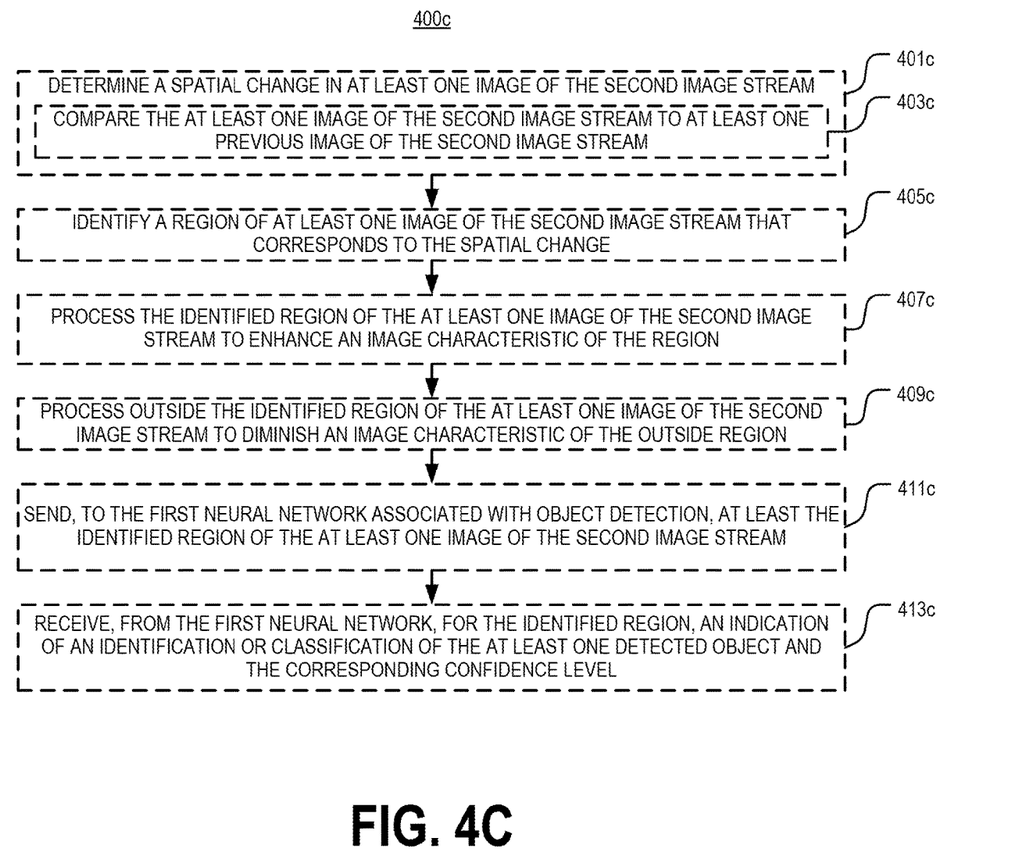

FIGS. 4A-C illustrate embodiments of a method 400a-c performed by a first network node 101, 200a, 300a-b, 500 of selecting a video stream in accordance with various aspects as described herein. However, it should be understood that portions of the method 400a-c may be distributed among multiple devices. In FIG. 4A, the method 400a may include receiving, from a first optical sensor device of the set of optical sensor devices, a second image stream of a set of image streams of the first optical sensor device, with the first optical sensor having a viewing angle towards the detected object, as represented by block 401a. At block 403, the method 400a may include sending, to a first neural network associated with object detection, at least one image of the second image stream. In response, the method 400a may include receiving, from the first neural network for the at least one image of the second image stream, an indication of at least one detected object and a corresponding confidence level, as referenced at block 405a. At block 407a, the method 400a may include obtaining a current network bandwidth utilization of the network. At block 409a, the method 400a includes selecting a first image stream of the set of image streams of the first optical sensor device based on the confidence level of the at least one detected object from the second image stream and the current network bandwidth utilization, with the first and second image streams having a different resolution or a different frame rate. At block 409a, the method 400a may include determining that the confidence level of the at least one identified object from the second image stream is at least a confidence level threshold that represents a certain level of certainty required to determine that an object is correctly identified by the second neural network. At block 411*a*, the method 400*a* may include receiving, from the first optical sensor device, the first image stream. At block 413*a*, the method 400*a* may include sending, to a second neural network associated with object identification or classification, at least one image of the first image stream. In response, the method 400*a* may include receiving, from the second neural network, for the at least one image of the first image stream, an indication of at least one identified or classified object and a corresponding confidence level, as represented at block 415*a*.

In FIG. 4B, the method 400*b* may include identifying a region of at least one image of the second image stream that corresponds to the at least one detected object, as represented by block 401*b*. At block 403*b*, the method 400*b* may include processing the identified region of the at least one image of the second image stream to enhance an image characteristic of the region. At block 405*b*, the method 400*b* may include processing outside the identified region of the at least one image of the second image stream to diminish an image characteristic of the outside region. At block 407*b*, the method 400*b* may include sending, to the second neural network associated with object identification or classification, at least the identified region of the at least one image of the second image stream. In response, the method 400*b* may include receiving, from the second neural network, for the identified region, an indication of an identification or classification of the at least one detected object and the corresponding confidence level, as represented by block 409*b*.

In FIG. 4C, the method 400*c* may include determining a spatial change in at least one image of the second image stream, as represented by block 401*c*. The method 400*c* may include comparing the at least one image of the second image stream to at least one previous image of the second image stream to determine the spatial change, as represented by block 403*c*. At block 405*c*, the method 400*c* may include identifying a region of at least one image of the second image stream that corresponds to the spatial change. At block 407*c*, the method 400*c* may include processing the identified region of the at least one image of the second image stream to enhance an image characteristic of the region. Further, the method 400*c* may include processing outside the identified region of the at least one image of the second image stream to diminish an image characteristic of the outside region, as represented by block 409*c*. At block 411*c*, the method 400*c* may include sending, to the first neural network associated with object detection, at least the identified region of the at least one image of the second image stream. In response, the method 400*c* may include receiving, from the first neural network, for the identified region, an indication of an identification or classification of the at least one detected object and the corresponding confidence level, as represented by block 413*c*.

FIG. 5 illustrates another embodiment of a network node or optical sensor device 500 in accordance with various aspects as described herein. In FIG. 5, device 500 includes processing circuitry 501 that is operatively coupled to input/output interface 505, neural network(s) circuit 509, network connection interface 511, power source 513, memory 515 including random access memory (RAM) 517, read-only memory (ROM) 519, and storage medium 521 or the like, communication subsystem 531, and/or any other component, or any combination thereof. Storage medium 521 may include operating system 523, application program(s) 525, data 527, and all or a portion of a set of image stream(s) 529 captured from optical sensor(s) 561, with each image stream having a certain resolution or a certain frame rate, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The device 500*a* may be configured to use an output device via input/output interface 505. For example, the output device may be a speaker, a sound card, a video card, a display, a monitor, a printer, an actuator, an emitter, a smartcard, a light emitting element (LED) display, another output device, or any combination thereof. The device 500 may be configured to use an input device via input/output interface 505 to allow a user to capture information into the device 500. The input device may include a touch-sensitive or presence-sensitive display, an optical sensor device(s) 561 (e.g., a digital camera, a digital video camera, a web camera, etc.), a microphone, a sensor, a mouse, a trackball, a directional pad, a trackpad, a scroll wheel, a smartcard, and the Ike. The presence-sensitive display may include a capacitive or resistive touch sensor to sense input from a user. A sensor may be, for instance, an accelerometer, a gyroscope, a tilt sensor, a force sensor, a magnetometer, an optical or image sensor, an infrared sensor, a proximity sensor, another like sensor, or any combination thereof.

In FIG. 5, the neural network(s) 509 may be configured to learn to perform tasks by considering examples such as performing object detection or object recognition/identification/classification of objects based on training images of different retail items. In one example, a first neural network circuit is configured to perform object detection and a second neural network circuit is configured to perform object recognition/identification/classification. The network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as bar code decoder, a widget or gadget engine or another application, a data file 527, and all or a portion of the set of image stream(s) 529 captured from optical sensor(s) 561. The storage medium 521 may store, for use by the device 500a, any of a variety of various ope rating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543b or over a peer-to-peer communication link using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500.

The features, benefits and/or functions described herein may be implemented in one of the components of the device 500a-b or partitioned across multiple components of the device 500a-b. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

In one exemplary embodiment, a computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or network types for illustrative purposes, but the embodiments are similarly applicable in other contexts and/or network types not explicitly described.

In one exemplary embodiment, a method comprises, by a network node operationally coupled over a network to a set of optical sensor devices positioned throughout a space. Further, each optical sensor device having an optical sensor with a viewing angle associated with a certain region of the space. Also, each optical sensor device operable to send at least one of a set of image streams to the network node over the network, with each image stream having a certain resolution or a certain frame rate. Additionally, each set of image streams corresponding to the certain region of the space, and the network node being operable to select the at least one of the set of image streams for each optical sensor device. The method comprises receiving, from a first optical sensor device of the set of optical sensor devices, a first image stream of a set of image streams of the first optical sensor device that is selected based on both a confidence level and a current network bandwidth utilization of the network so as to maintain the current network bandwidth utilization below a network bandwidth utilization threshold. The confidence level represents a level of certainty that at least one object is correctly detected from a second image stream of the set of image streams received from the first optical sensor. Additionally, the first and second image streams include a different resolution or a different frame rate. Also, the first optical sensor includes a viewing angle towards the detected object.

In another exemplary embodiment, the method further includes selecting the first image stream of the set of image streams based on the confidence level of the at least one detected object and the current network bandwidth utilization.

In another exemplary embodiment, the method further includes sending, to a first neural network associated with object detection, at least one image of the second image stream. The method also includes receiving, from the first neural network, for the at least one image of the second image stream, an indication of the at least one detected object and the corresponding confidence level.

In another exemplary embodiment, the selecting step further includes determining that the confidence level of the at least one detected object from the second image stream is at least a confidence level threshold. The confidence level threshold represents a certain level of certainty required to determine that an object is correctly detected by the first neural network. A resolution or frame rate of the first image stream is less than a resolution or a frame rate of the second image stream.

In another exemplary embodiment, the selecting step further includes determining that the confidence level of the at least one detected object from the second image stream is less than a confidence level threshold. The confidence level threshold represents a certain level of certainty required to determine that an object is correctly detected by the first neural network. A resolution or frame rate of the first image stream is greater than a resolution or a frame rate of the second image stream.

In another exemplary embodiment, the method further includes sending, to a second neural network associated with object identification or classification, at least one image of the second image stream. The method also includes receiving, from the second neural network, for the at least one image of the second image stream, an indication of an identification of the at least one detected object and the confidence level.

In another exemplary embodiment, the selecting step further includes determining that the confidence level of the at least one identified object from the second image stream is at least a confidence level threshold. The confidence level threshold represents a certain level of certainty required to determine that an object is correctly identified by the second neural network. A resolution or a frame rate of the first image stream is less than a resolution or frame rate of the second image stream.

In another exemplary embodiment, the selecting step further includes determining that the confidence level of the at least one identified object from the second image stream is less than a confidence level threshold. The confidence level threshold represents a certain level of certainty required to determine that an object is correctly identified by the second neural network, wherein a resolution or frame rate of the first image stream is greater than a resolution or frame rate of the second image stream.

In another exemplary embodiment, the method further includes identifying a region of at least one image of the second image stream that corresponds to the at least one detected object.

In another exemplary embodiment, the method further includes processing the identified region of the at least one image of the second image stream to enhance an image characteristic of the region.

In another exemplary embodiment, the method further includes processing outside the identified region of the at least one image of the second image stream to diminish an image characteristic of the outside region.

In another exemplary embodiment, the method further includes sending, to a second neural network associated with object identification or classification, at least the identified region of the at least one image of the second image stream. The method also includes receiving, from the second neural network, for the identified region, an indication of an identification or classification of the at least one detected object and the corresponding confidence level In another exemplary embodiment, the method further includes determining a spatial change in at least one image of the second image stream and identifying a region of the at least one image of the second image stream that corresponds to the spatial change.

In another exemplary embodiment, the method further includes processing the identified region of the at least one image of the second image stream to enhance an image characteristic of the region.

In another exemplary embodiment, the method further includes processing outside the identified region of the at least one image of the second image stream to diminish an image characteristic of the outside region.

In another exemplary embodiment, determining a spatial change in at least one image of the second image stream, identifying a region of the at least one image of the second image stream that corresponds to the spatial change.

In another exemplary embodiment, determining the spatial change in the at least one image of the second image stream includes detecting a sudden appearance of an object in the at least one image of the second image stream.

In another exemplary embodiment, determining the spatial change in the at least one image of the second image stream includes comparing the at least one image of the second image stream to at least one previous image of the second image stream.

In one exemplary embodiment, a first network node comprises a processor and a memory, with the memory containing instructions executable by the processor whereby the processor is configured to select a first image stream of a set of image streams to receive, from a first optical sensor device of a set of optical sensor devices positioned throughout a space and operationally coupled to the network node over a network, a first image stream of a set of image streams of the first optical sensor device that is selected based on both a confidence level that represents a level of certainty that at least one object is correctly detected from a second image stream of the set of image streams received from the first optical sensor and a current network bandwidth utilization of the network so as to maintain the current network bandwidth utilization below a certain network bandwidth utilization threshold. The first and second image streams having a different resolution or a different frame rate. The first optical sensor having a viewing angle towards the detected object. Each optical sensor device including an optical sensor with a viewing angle associated with a certain region of the space and enabled to send at least one of a set of image streams to the network node over the network. Each image stream having a certain resolution or a certain frame rate, and with each set of image streams corresponding to the certain region of the space. The network node is operable to select the at least one of the set of image streams for each optical sensor device.

In one exemplary embodiment, a method is performed by a network node operationally coupled over a network to a set of optical sensor devices positioned throughout a space. Each optical sensor device has an optical sensor with a viewing angle associated with a region of the space. Also, each optical sensor device is operable to send at least one of a set of image streams to the network node over the network, with each image stream having a network bandwidth utilization. Each set of image streams correspond to a region of the space. Further, the network node is operable to select the at least one of the set of image streams for each optical sensor device. The method includes receiving, from a first optical sensor device of the set of optical sensor devices, a first image stream of a set of image streams of the first optical sensor device that is selected based on both a confidence level and a current network bandwidth utilization of the network or a segment of the network so as to maintain the current network bandwidth utilization below a network bandwidth utilization threshold. The confidence level represents a level of certainty that at least one object is correctly detected from a second image stream of the set of image streams received from the first optical sensor. Additionally, a first network bandwidth utilization of the first image stream is different from a second network bandwidth utilization of the second image stream. Also, the first optical sensor has a viewing angle towards the detected object.

In another exemplary embodiment, the method may include determining a network bandwidth utilization of the network node over the network based on a resolution of an image stream received from the first optical sensor.

In another exemplary embodiment, the method may include determining a network bandwidth utilization of the network node over the network based on a frame rate of an image stream received from the first optical sensor.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
   by a network node operationally coupled over a network to a set of optical sensor devices positioned throughout a space, with each optical sensor device having an optical sensor with a viewing angle associated with a certain region of the space and enabled to send at least one of a set of image streams associated with that certain region to the network node over the network, with each image stream having a certain resolution or frame rate, the network node being operable to select the at least one of the set of image streams of each optical sensor device,
   receiving, from a first optical sensor device of the set of optical sensor devices, a first image stream of the set of image streams of the first optical sensor device that is selected based on both a confidence level that represents a level of certainty that a detected object is correctly detected from a second image stream of the set of image streams received from the first optical sensor and a current network bandwidth utilization of the network so that the confidence level of the detected object detected from the first image stream is increased or decreased from the confidence level of the detected object detected from the second image stream and the current network bandwidth utilization of the network is maintained below a certain network bandwidth utilization threshold, with the first and second image streams having a different resolution or frame rate and the first optical sensor having a viewing angle towards the detected object.

2. The method of claim 1, wherein each image stream has the certain frame rate, with the first and second image streams having different frame rates.

3. The method of claim 1, further comprising:
   selecting the first image stream of the set of image streams based on the confidence level of the detected object and the current network bandwidth utilization.

4. The method of claim 1, further comprising:
   sending, to a first neural network associated with object detection, at least one image of the second image stream; and
   receiving, from the first neural network, for the at least one image of the second image stream, an indication of the detected object and the corresponding confidence level.

5. The method of claim 4, wherein the selecting the first image stream is responsive to determining that the confidence level of the detected object from the second image stream is at least a confidence level threshold that represents a certain level of certainty required to determine that the detected object is correctly detected by the first neural network, wherein the certain resolution or frame rate of the first image stream is less than the certain resolution or frame rate of the second image stream.

6. The method of claim 4, wherein the selecting the first image stream is responsive to determining that the confidence level of the detected object from the second image stream is less than a confidence level threshold that represents a certain level of certainty required to determine that the certain object is correctly detected by the first neural network, wherein the certain resolution or frame rate of the first image stream is greater than the certain resolution or frame rate of the second image stream.

7. The method of claim 1, further comprising:
   sending, to a second neural network associated with object identification or classification, at least one image of the second image stream; and
   receiving, from the second neural network, for the at least one image of the second image stream, an indication of an identification of the detected object and the confidence level.

8. The method of claim 7, wherein the selecting the first image stream is responsive to determining that the confidence level of the identified object from the second image stream is at least a confidence level threshold that represents a certain level of certainty required to determine that an object is correctly identified by the second neural network, wherein the certain resolution or frame rate of the first image stream is less than the certain resolution or frame rate of the second image stream.

9. The method of claim 7, wherein the selecting the first image stream is responsive to determining that the confidence level of the identified object from the second image stream is less than a confidence level threshold that represents a certain level of certainty required to determine that an object is correctly identified by the second neural network, wherein the certain resolution or frame rate of the first image stream is greater than the certain resolution or frame rate of the second image stream.

10. The method of claim 1, further comprising:
    identifying a region of at least one image of the second image stream that corresponds to the detected object.

11. The method of claim 10, further comprising:
    processing the identified region of the at least one image of the second image stream to enhance an image characteristic of the region.

12. The method of claim 10, further comprising:
    processing outside the identified region of the at least one image of the second image stream to diminish an image characteristic of the outside region.

13. The method of claim 9, further comprising:
    sending, to a second neural network associated with object identification or classification, at least the identified region of the at least one image of the second image stream; and
    receiving, from the second neural network, for the identified region, an indication of an identification or classification of the detected object and the corresponding confidence level.

14. The method of claim 1, further comprising:
    in response to determining a spatial change in at least one image of the second image stream, identifying a region of the at least one image of the second image stream that corresponds to the spatial change.

15. The method of claim 14, further comprising:
processing the identified region of the at least one image of the second image stream to enhance an image characteristic of the region.

16. The method of claim 14, further comprising:
processing outside the identified region of the at least one image of the second image stream to diminish an image characteristic of the outside region.

17. The method of claim 14, further comprising:
sending, to a first neural network associated with object detection, at least the identified region of the second image stream; and
receiving, from the first neural network, for the at least identified region, an indication of an object detection of the detected object and the corresponding confidence level.

18. The method of claim 14, wherein the determining the spatial change in the at least one image of the second image stream includes detecting a movement of an object in the at least one image of the second image stream.

19. The method of claim 14, wherein the determining the spatial change in the at least one image of the second image stream includes detecting a sudden appearance of an object in the at least one image of the second image stream.

20. The method of claim 14, wherein the determining the spatial change in the at least one image of the second image stream includes comparing the at least one image of the second image stream to at least one previous image of the second image stream.

21. A network node, comprising:
with the network node being operationally coupled over a network to a set of optical sensor devices positioned throughout a space, with each optical sensor device having an optical sensor with a viewing angle associated with a certain region of the space and enabled to send at least one of a set of image streams associated with that certain region to the network node over the network, with each image stream having a certain resolution or frame rate, the network node being operable to select the at least one of the set of image streams of each optical sensor device; and
wherein the network node further includes a processor and a memory, the memory containing instructions executable by the processor whereby the processor is configured to:
receive, from a first optical sensor device of the set of optical sensor devices, a first image stream of the set of image streams of the first optical sensor device that is selected based on both a confidence level that represents a level of certainty that a detected object is correctly detected from a second image stream of the set of image streams received from the first optical sensor and a current network bandwidth utilization of the network so as to that the confidence level of the detected object detected from the first image stream is increased or decreased from the confidence level of the detected object detected from the second image stream and the current network bandwidth utilization of the network is maintained below a certain network bandwidth utilization threshold, with the first and second image streams having a different resolution or frame rate and the first optical sensor having a viewing angle towards the detected object.

\* \* \* \* \*